United States Patent [19]

Heismann et al.

[11] 4,444,002
[45] Apr. 24, 1984

[54] GRASS CLIPPING CATCHER

[75] Inventors: Richard A. Heismann, Knoxville; Richard R. Morse, Galesburg, both of Ill.

[73] Assignee: Outboard Marine Corporation, Waukegan, Ill.

[21] Appl. No.: 405,734

[22] Filed: Aug. 6, 1982

[51] Int. Cl.³ .............................................. A01D 53/06
[52] U.S. Cl. ..................................... 56/202; 56/320.2
[58] Field of Search ............. 56/16.6, 202, 203, 320.2; 150/2, 7, 10, DIG. 1

[56] References Cited

U.S. PATENT DOCUMENTS

| | | | |
|---|---|---|---|
| 3,143,843 | 8/1964 | Allina | 56/202 |
| 3,527,037 | 9/1970 | Leader | 56/202 |
| 3,726,069 | 4/1973 | Cope | 56/202 |
| 3,820,313 | 6/1974 | Hoffman | 56/202 |
| 4,031,694 | 6/1977 | Gobin | 56/202 |

FOREIGN PATENT DOCUMENTS 988307  5/1976  Canada ................................. 56/202

Primary Examiner—Gene Mancene
Assistant Examiner—John Weiss
Attorney, Agent, or Firm—Michael, Best & Friedrich

[57] ABSTRACT

Disclosed herein is a grass catcher for a rotary lawn mower, which catcher comprises a frame including a first frame portion defining a mouth adapted to receive grass clippings from a lawn mower and a second frame portion extending from the first frame portion and defining an area removably coverable to facilitate clippings accumulation in and discharge from the catcher, and a bag on the frame including a pair of spaced side walls extending from the first and second frame portions, a rear wall located in spaced relation from the first frame portion, extending from the second frame portion and between and connected to the side walls, an additional wall extending from the first frame portion in opposing relation to the area, extending between and connected to the side walls, and connected to the rear wall, a cover extending from the mouth and being locatable in covering relation to the area, and an elastisized member for releasably retaining the cover in covering relation to the area.

5 Claims, 5 Drawing Figures

U.S. Patent    Apr. 24, 1984    4,444,002
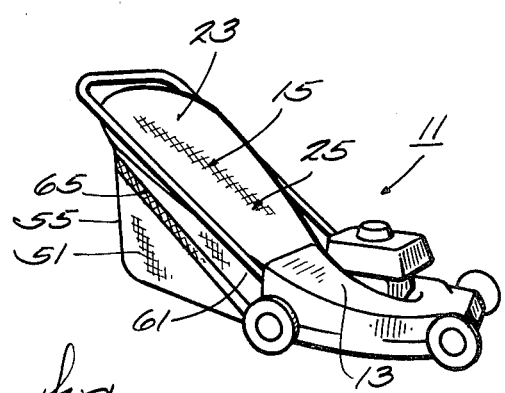
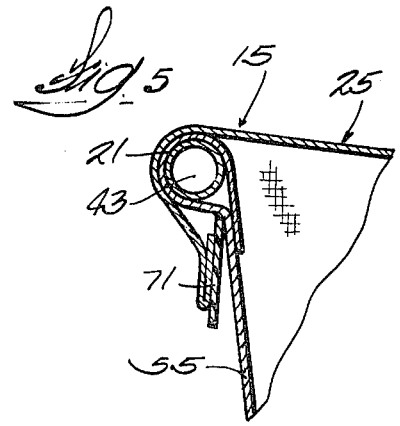
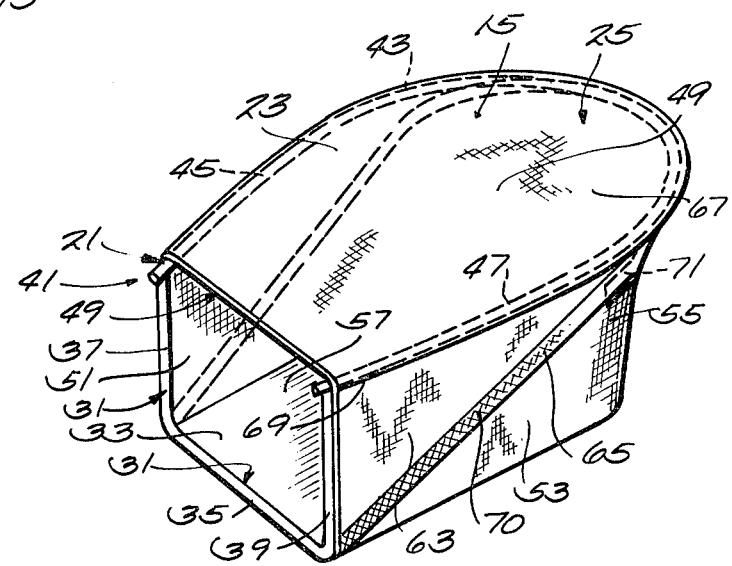
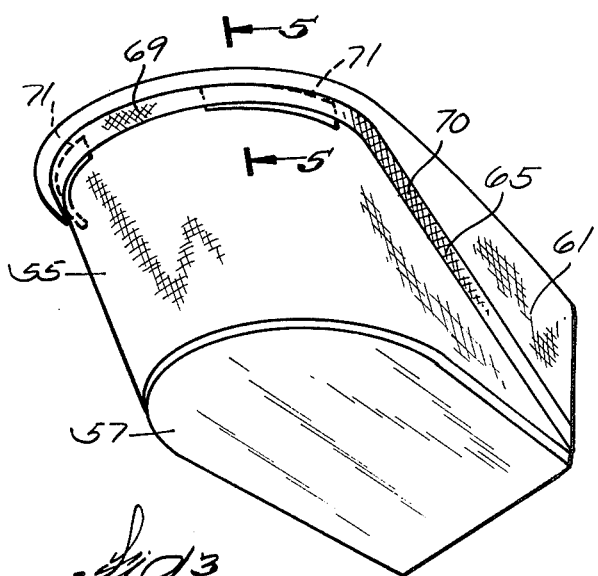
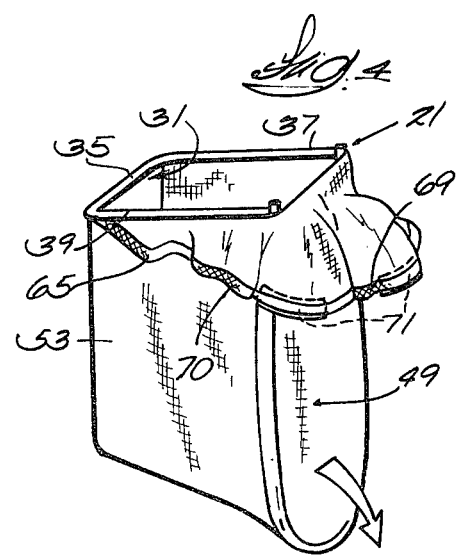

GRASS CLIPPING CATCHER

The invention relates generally to grass clipping catchers for rotary lawn mowers. More particularly, the invention relates to a grass catcher which can be removably attached to the discharge chute of a lawn mower and which has an improved arrangement for opening thereof so as to permit discharge of the cut grass. More particularly, the invention disclosed hereinafter provides a positive closure for the bag portion of the catcher.

Attention if directed to the grass catcher shown in FIG. 10 of U.S. Pat. No. 4,031,694 issued June 28, 1977.

SUMMARY OF THE INVENTION

The invention provides a grass catcher for a rotary lawn mower, which catcher comprises a relatively rigid frame including a first frame portion defining a mouth adapted to receive grass clippings from a lawn mower and a second frame portion extending from the first frame portion and defining an area removably coverable to facilitate clipping accumulation in and discharge from the catcher, and a bag on the frame including a pair of spaced side walls fixed to and extending from the first and second frame portions, a rear wall fixed to and extending from the second frame portion, located in spaced relation from the first frame portion, and extending between and connected to the side walls, an additional wall fixed to and extending from the first frame portion in opposing relation to the area, extending between and connected to the side walls, and connected to the rear wall, a cover including a pair of spaced end panels fixed to and extending from the first frame portion and in partially overlying relation to the side walls and from adjacent the additional wall, and a cover panel extending from the mouth and between and connected to the end panels, which cover panel is locatable in covering relation to the area, and means including an elastic member for releasably retaining the cover panel in covering relation to the area.

The invention also provides a grass catcher for a rotary lawn mower, which catcher comprises a relatively rigid frame including a first frame portion defining an open mouth adapted to receive grass clippings from a lawn mower and a second frame portion extending transversely from the first frame portion and defining an area removably coverable to facilitate clipping accumulation in and discharge from the catcher, which second frame portion includes a part remote from the first frame portion, and a bag on the frame including a pair of spaced side walls fixed to and extending from the first and second frame portions, a rear wall fixed to and extending from the second frame portion, located in spaced relation from the first frame portion, and extending between and connected to the side walls, an additional wall fixed to and extending from the first frame portion in opposing relation to the area, extending between and connected to the side walls, and connected to the rear wall, a cover including a pair of spaced end panels respectively fixed to and extending from the first frame portion and from adjacent the additional walland in partially overlying relation to the side walls, and respectively having peripheral edges, a cover panel extending from the mouth and between and connected to the end panels, and having a peripheral edge forming a continuation of the side panel peripheral edges and locatable beyond the remote part of the second frame portion, and an elastic member provided at least in one portion of one of the peripheral edges and being in stressed condition in response to location of the peripheral edge of the cover panel rearwardly of and below the remote part of the second frame portion.

The invention also provides a grass catcher for a rotary lawn mower, which catcher comprises a relatively rigid frame including a first frame portion defining an open mouth adapted to receive grass clippings from a lawn mower and including a horizontal leg and two spaced upright legs extending respectively from the opposite ends of the horizontal leg and having respective upper ends, and a second frame portion extending transversely from the first frame portion and defining an area removably coverable to facilitate clipping accumulation in and discharge from the catcher, which second frame portion includes an arcuate rear part remote from the first frame portion and a pair of side legs respectively extending forwardly from the opposite ends of the remote arcuate part and respectively fixed to the upper ends of the upright legs, and a bag on the frame including a pair of spaced side walls fixed to and extending from the upright legs and the side legs, a rear wall fixed to and extending from the arcuate rear part of the second frame portion, located in spaced relation from the first frame portion, and extending between and connected to the side walls, a bottom wall fixed to and extending from the horizontal leg of the first frame portion in opposing relation to the area, extending between and connected to the side walls, and connected to the rear wall, a cover including a pair of spaced end panels respectively fixed to and extending from the upright legs of the first frame portion and in partially overlying relation to the side walls, and respectively having peripheral edges, a cover panel extending from the mouth and between and connected to the end panels and having a peripheral edge forming a continuation of the side panel peripheral edges and locatable beyond the rear part of the second frame portion, an elastic member provided at least in one portion of one of the peripheral edges and being in stressed condition in response to location of the peripheral edge of the cover panel partially around and below the rear part of the second frame portion, and an arcuate plastic strip provided in the peripheral edge of the cover panel and having an upper edge located, when the cover panel is in covering relation to the area and when the peripheral edge of the cover panel is located partially around and below the rear part of the second frame portion, to be displaced upwardly and cammed inwardly of the rear frame part in response to a stress against the cover panel in the area defined by the second frame portion.

One of the features of the invention is the provision of a grass clipping catcher having an access or cover panel facilitating dumping of grass from the grass catcher.

Another of the features of the invention is the provision of a closure system which prevents the access or cover panel from opening upon impact of a foreign object and which serves to reinforce the closure of the bag upon striking of a foreign object.

Other features and advantages of the embodiments of the invention will become known by reference to the following general description, claims and appended drawings.

IN THE DRAWINGS

FIG. 1 is a perspective view of a lawn mower including a grass catcher in accordance with the present invention.

FIG. 2 is an enlarged perspective view of the grass catcher.

FIG. 3 is a rear perspective view of the grass catcher with the cover in the closed position; and FIG. 4 is a perspective view of the grass catcher removed from the lawn mower and showing the cover in the position facilitating discharge of clippings from the catcher.

FIG. 5 is an enlarged sectional view taken along line 5—5 of FIG. 3.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a rotary lawn mower 11 including a discharge chute 13 to which a grass catcher 15 is removably attachable. Any suitable means can be employed for attaching the catcher 15 to the discharge chute 13. The grass catcher 15 comprises a frame 21 and a bag 23 supported from the frame 21 and having a cover 25 which is partially removable from the frame 21 to afford discharge of the grass clippings from the catcher 15.

More particularly, the frame 21 is preferably fabricated of rigid metal, such as metal tubing, and comprises a first frame portion 31 which defines an open mouth 33 for receiving grass clippings from the lawn mower discharge chute 13 and which is generally U-shape including a lower horizontal leg 35 and two spaced apart upright legs 37 and 39 extending from the ends of the horizontal leg 35.

The frame 21 further includes a second frame portion 41 which extends transversely of and from the first frame portion 31 and which is also generally of U-shape including an arcuate part 43 which is remote from the first frame portion 31, and a pair of spaced side parts or legs 45 and 47 which extend forwardly from the ends of the remote arcuate part 43 and which are suitably fixed, by welding or otherwise, to the upper ends of the upright legs 37 and 39 of the first frame portion 31. The side parts 45 and 47 of the second frame portion 41 can extend rearwardly in parallel relation to each other or in outwardly diverging relation. In general, the second frame portion 41 defines an area 49.

The frame 21 is covered by the bag 23 which is preferably fabricated of flexible fabric material permitting airflow therethrough, and which includes a pair of spaced side walls 51 and 53 which are respectively suitably fixed to and extend rearwardly from the upright legs 37 and 39 of the first frame portion 31, and which are also respectively fixed to and extend downwardly from the side parts 45 and 47 of the second frame portion 41.

The bag 23 also includes a rear wall 55 which is located in remotely spaced relation from the first frame portion 31, which is suitably fixed to and extends downwardly from the arcuate remote part 43 of the second frame portion 41, and which extends between and connects the spaced side walls 51 and 53.

The bag 23 also includes an additional or bottom wall 57 which is fixed to and extends rearwardly from the horizontal leg 35 of the first frame portion 31 and which extends between and is connected to the side walls 51 and 53 and which extends to and is connected to the rear wall 55. If desired, the bottom wall can be reinforced or can be constructed of relatively rigid material.

As thus far disclosed, the bag is four-sided, i.e., is provided with interconnected bottom, side and rear walls.

The bag 23 also includes the cover 25 which is adapted to removably cover the area 49 defined by the second frame portion 41.

The cover 25 includes a pair of spaced side panels 61 and 63 which are respectively fixed to and extend from the upright legs 37 and 39 of the first frame portion 31, which extend in partially overlying relation to the side walls 51 and 53, and which have respective lower peripheral edges or hems 65. In the disclosed construction, the side panels 61 and 63 extend for substantially the full height of the first frame portion legs 37 and 39 and the peripheral edges or hems 65 extend diagonally upwardly from adjacent the bottom of the legs 37 and 39 toward the remote arcuate part 43 of the second frame portion 41.

The cover 25 further includes a cover panel 67 which is adapted to cover the area 49 defined by the second frame portion 41, which extends between and connects the side panels 61 and 63, and which extends rearwardly from the mouth 33 and terminates in a peripheral edge or hem 69 which forms a continuation of the peripheral lower edges or hems 65 of the side panels 61 and 63 and which is locatable beyond and below the arcuate remote part 43 of the second frame portion 41.

The bag 23 also includes means for releasably retaining the cover 25 in covering relation to the area 49 defined by the second frame portion 41. While various constructions can be employed, in the illustrated construction, such means comprises the cover panel peripheral edge or margin or hem 69 which extends beyond the remote arcuate part 43 of the second frame portion 41, together with provision in at least a part of the peripheral edges or hems 65 and 69 of an elastic means or member 70 which is incorporated in the bag 23 in such manner that, when the cover panel hem 69 is located beyond the remote arcuate part 43 of the second frame portion 41, the elastic is suitably stretched so as to tuck the peripheral hem 69 against the outer surface of the rear wall 55 below the arcuate remote part 43 of the second frame portion 41 and so as to releasably retain the hem 69 in such location due to a continuing stressed condition in the elastic.

The cover closing means also includes one or more arcuate plastic strips 71 which are attatched to the inward surface of the hem or the peripheral edge 69 of the cover panel 67 in the area of the arcuate rear part 43 of the second frame portion 41 and which are relatively rigid but nonetheless somewhat flexible. The strips 71 are contoured to fit immediately within the concave curve of the remote arcuate part 43 of the second frame portion 41. While a single strip could be employed, in the illustrated construction, two arcuate plastic segments or strips 71 are employed in spaced relation to each other.

In use, the tension placed on the cover 25 by the elastic in the hems 65 and/or 69 locates the plastic strips 71 under and inwardly of the center of the tubular construction of the arcuate remote or rear part 43 of the second frame portion 41. In the event the cover panel 67 is struck by an object propelled by the cutter blade (not shown), the effect on the cover 25 is to draw the cover panel hem 69 upwardly, thereby inserting the upper edge of the plastic strips 71 inwardly of the arcuate rear part 43 of the second frame portion 41 and thereby to releasably lock the cover panel 67 in closed position. It is noted that the curved cross-section of the tubing which forms the frame 21 helps to cam the plastic strips 71 inwardly into their locking position.

Of course, when it is desired to empty the catcher 15, the hems 65 and 69 can be stretched to permit disengagement thereof with the remote arcuate rear portion 43 of the second frame portion 41, thereby permitting withdrawal of the cover panel 67 from the major portion of the area 49 defined by the second frame portion 41 so as to facilitate discharge of the clippings from the bag 23 through the discharge access opening thereby provided.

If desired, the elastic means could extend slightly below and in adjacent parallel relation to the side parts 45 and 47 of the second frame portion 41 instead of extending diagonally toward the lower end of the upright legs 37 and 39 of the first frame portion 31.

Various of the features of the invention are set forth in the following claims:

We claim:

1. A grass catcher for a rotary lawn mower, said catcher comprising a relatively rigid frame including a first frame portion defining a mouth adapted to receive grass clippings from a lawn mower and a second frame portion extending from said first frame portion and defining an area removably coverable to facilitate clipping accumulation in and discharge from the catcher, and a bag on said frame including a pair of spaced side walls fixed to and extending from said first frame portion, a rear wall fixed to and extending from said second frame portion, located in spaced relation from said first frame portion, and extending between and connected to said side walls, an additional wall fixed to and extending from said first frame portion in opposing relation to said area, extending between and connected to said side walls, and connected to said rear wall, a cover including a pair of spaced end panels fixed to and extending from said first frame portion and from adjacent said additional wall and in partially overlying relation to said side walls, and a cover panel extending from said mouth and between and connected to said end panels, said cover panel being locatable in covering relation to said area, and means including an elastic member for releasably retaining said cover panel in covering relation to said area.

2. A grass catcher for a rotary lawn mower, said catcher comprising a relatively rigid frame including a first frame portion defining an open mouth adapted to receive grass clippings from a lawn mower and a second frame portion extending transversely from said first frame portion and defining an area removably coverable to facilitate clipping accumulation in and discharge from the catcher, said second frame portion including a remote part spaced from said first frame portion, and a bag on said frame including a pair of spaced side walls fixed to and extending from said first and second frame portions, a rear wall fixed to and extending from said second frame portion, located in spaced relation from said first frame portion, and extending between and connected to said side walls, an additional wall fixed to and extending from said first frame portion in opposing relation to said area, extending between and connected to said side walls, and connected to said rear wall, a cover including a pair of spaced end panels respectively fixed to and extending from said first frame portion and from adjacent said additional wall and in partially overlying relation to said side walls, and respectively having peripheral edges, a cover panel extending from said mouth and between and connected to said end panels, and having a peripheral edge forming a continuation of said side panel peripheral edges and locatable beyond said remote part of said second frame portion, and an elastic member provided in said cover and being in stressed condition in response to location of said peripheral edge of said cover panel rearwardly of and below said remote part of said second frame portion.

3. A grass catcher in accordance with claim 2 wherein said elastic member extends, in part, in each of said peripheral edges.

4. A grass catcher in accordance with claim 2 and further including a plastic strip provided in said peripheral edge of said cover panel, said plastic strip having an upper edge located, when said cover panel is in covering relation to said area, to be displaced upwardly and cammed inwardly of said remote part of said second frame portion in response to a stress against said cover panel in said area defined by the second frame portion.

5. A grass catcher for a rotary lawn mower, said catcher comprising a relatively rigid frame including a first frame portion defining an open mouth adapted to receive grass clippings from a lawn mower and including a horizontal leg and two spaced upright legs extending respectively from the opposite ends of said horizontal legs and having respective upper ends, and a second frame portion extending transversely from said first frame portion and defining an area removably coverable to facilitate clipping accumulation in and discharge from the catcher, said second frame portion including an arcuate rear part remote from said first frame portion and a pair of side legs respectively extending forwardly from the opposite ends of said remote arcuate part and respectively fixed to said upper ends of said upright legs, and a bag on said frame including a pair of spaced side walls fixed to and extending from said upright legs and said side legs, a rear wall fixed to and extending from said arcuate rear part of said second frame portion, located in spaced relation from said first frame portion, and extending between and connected to said side walls, a bottom wall fixed to and extending from said horizontal leg of said first frame portion in opposing relation to said area, extending between and connected to said side walls, and connected to said rear wall, a cover including a pair of spaced end panels respectively fixed to and extending from said upright legs of said first frame portion and in partially overlying relation to said side walls, and respectively having peripheral edges, a cover panel extending from said mouth and between and connected to said end panels, and having a peripheral edge forming a continuation of said side panel peripheral edges and locatable beyond said rear part of said second frame portion, an elastic member provided at least in one portion of one of said peripheral edges and being in stressed condition in response to location of said peripheral edge of said cover panel partially around and below said rear part of said second frame portion, and an arcuate plastic strip provided in said peripheral edge of said cover panel and having an upper edge located, when said cover panel is in covering relation to said area and when said peripheral edge of said cover panel is located partially around and below said rear part of said second frame portion, to be displaced upwardly and cammed inwardly of said rear frame part in response to a stress against said cover panel in the area defined by said second frame portion.

* * * * *